United States Patent

Hatwar et al.

[11] Patent Number: 5,948,497
[45] Date of Patent: Sep. 7, 1999

[54] HIGH STABILITY SILVER BASED ALLOY REFLECTORS FOR USE IN A WRITABLE COMPACT DISK

[75] Inventors: Tukaram Kisan Hatwar, Penfield; Douglas Greg Stinson, Fairport, both of N.Y.

[73] Assignee: Eastman Kodak Company, Rochester, N.Y.

[21] Appl. No.: 07/963,189

[22] Filed: Oct. 19, 1992

[51] Int. Cl.$^6$ ........................................ G11B 5/66
[52] U.S. Cl. ............... 428/64.2; 428/64.3; 428/64.4; 428/64.6; 428/64.8; 428/65.3; 428/65.5; 428/694 RL; 428/694 DE; 428/900; 428/128; 428/129; 428/130; 428/131; 369/13; 430/945
[58] Field of Search .................. 428/900, 694 RL, 428/694 DE, 64.2, 64.3, 64.4, 64.6, 64.8, 65.3, 65.5; 369/13; 430/945; 427/128–130, 131

[56] References Cited

U.S. PATENT DOCUMENTS

| | | | |
|---|---|---|---|
| 4,205,989 | 6/1980 | Moriya et al. | 430/306 |
| 4,565,719 | 1/1986 | Phillips et al. | 428/34 |
| 4,717,628 | 1/1988 | Takahashi et al. | 428/457 |
| 4,840,873 | 6/1989 | Kobayashi et al. | 430/273.1 |
| 4,990,388 | 2/1991 | Hamada et al. | 346/135.1 |
| 5,016,240 | 5/1991 | Strandjord et al. | 369/288 |
| 5,032,470 | 7/1991 | Shindo et al. | 428/694 MT |
| 5,041,356 | 8/1991 | Takeda et al. | 430/270.1 |
| 5,080,946 | 1/1992 | Takagisi | 428/64.9 |

FOREIGN PATENT DOCUMENTS

| | | |
|---|---|---|
| 204243 | 11/1989 | Japan . |
| 25737 | 4/1991 | Japan . |
| 102241 | 4/1992 | Japan . |

OTHER PUBLICATIONS

*CRC Handbook of Chemistry and Physics*, 64$^{th}$ ed.; CRC Press Boca Ratan, 1983; pp. E–11→E–14.

*Primary Examiner*—Leszek Kiliman
*Attorney, Agent, or Firm*—Raymond L. Owens

[57] ABSTRACT

A writable compact disk has a plastic substrate, a recording layer, a reflecting layer, and a protective overcoat, the reflecting layer is comprised of a silver-palladium alloy, a silver-copper alloy, or a silver-palladium-copper alloy. By maintaining the palladium component of the alloy less that 15 at. % and the copper component of the alloy less than 30 at. %, the reflectance of the reflecting layer can be similar to the typical gold reflecting layer while jitter and NORP levels can be reduced for illumination power levels exceeding the power normally used to write on the recording layer.

9 Claims, 6 Drawing Sheets

HIGH STABILITY SILVER BASED ALLOY REFLECTORS FOR USE IN A WRITABLE COMPACT DISK

BACKGROUND OF THE INVENTION

1. Field of Invention

This invention relates generally to compact disks and, more particularly, to the reflecting layer typically found on compact disk.

2. Description of the Related Art

Writable compact disks, i.e., compact disks upon which information can be written after the manufacture thereof, have been previously described in the related art. The Photo CD is an example of this type of storage medium. As illustrated ing FIG. 1, a writable compact disk has a pre-grooved plastic substrate 11, an (organic dye) recording layer 12, a (metal) reflector layer 13, and a protective (lacquer) overcoat. The conventional writable storage medium uses a thin layer of gold as the reflecting layer. The gold reflecting layer exhibits both high stability and high reflectivity. However, gold is expensive and has several undesirable features when used as a reflecting material in a storage medium. By way of specific example, the gold reflecting layer is typically fabricated by a sputtering deposition process in order to achieve high product throughput. However, the gold layer has relatively poor adhesion to the organic dye recording layer. During higher power writing processes, such as when information is being stored at greater than the normal reading speed and the laser power must be correspondingly increased, the gold layer delaminates and cracks are produced in the dye layer. (The higher power levels are used to expedite the writing period normally used to record information at the typical disk speed.) In addition, the gold reflecting layer exhibits enhanced noise at power levels typically used to record at speeds which are greater than the normal reading speeds. This phenomenon is referred to as Noise at Optimum Recording Power (NORP) and is a serious problem in writable media using dyes.

A need has therefore been felt for a reflecting layer in writable compact disk media which has high reflectivity and long term durability and which does not use a gold material.

SUMMARY OF THE INVENTION

It is an object of the present invention to provide an improved storage medium.

It is a feature of the present invention to provide an improved reflecting layer in a optical storage medium.

It is a more particular feature of the present invention to provide a reflecting layer in a storage medium comprised of a silver-palladium alloy.

It is another more particular feature of the present invention to provide a reflecting layer in a storage medium comprised of a silver-palladium-copper alloy storage medium.

The present invention is directed to overcoming one or more of the problems set forth above. Briefly summarized, according to one aspect of the present invention, alloys of silver with palladium and/or copper have been found to exhibit properties suitable for replacing gold metal as a reflecting layer in a compact disk. The media using silver alloys as reflecting layers exhibit significantly lower jitter and substantially reduced NORP as compared to gold layers deposited under the same sputtering conditions. The additions of palladium (in the order of 1–15 at. %) or copper (1–30 at. %) to silver increases the environmental stability without significantly compromising the optical properties in the reflecting layer application.

These and other aspects, objects, features and advantages of the present invention will be more clearly understood and appreciated from a review of the following detailed description of the preferred embodiments and appended claims, and be reference to the accompanying drawings.

DESCRIPTION OF THE PREFERRED EMBODIMENTS

1. Detailed Description of the Figures

Figure 1:
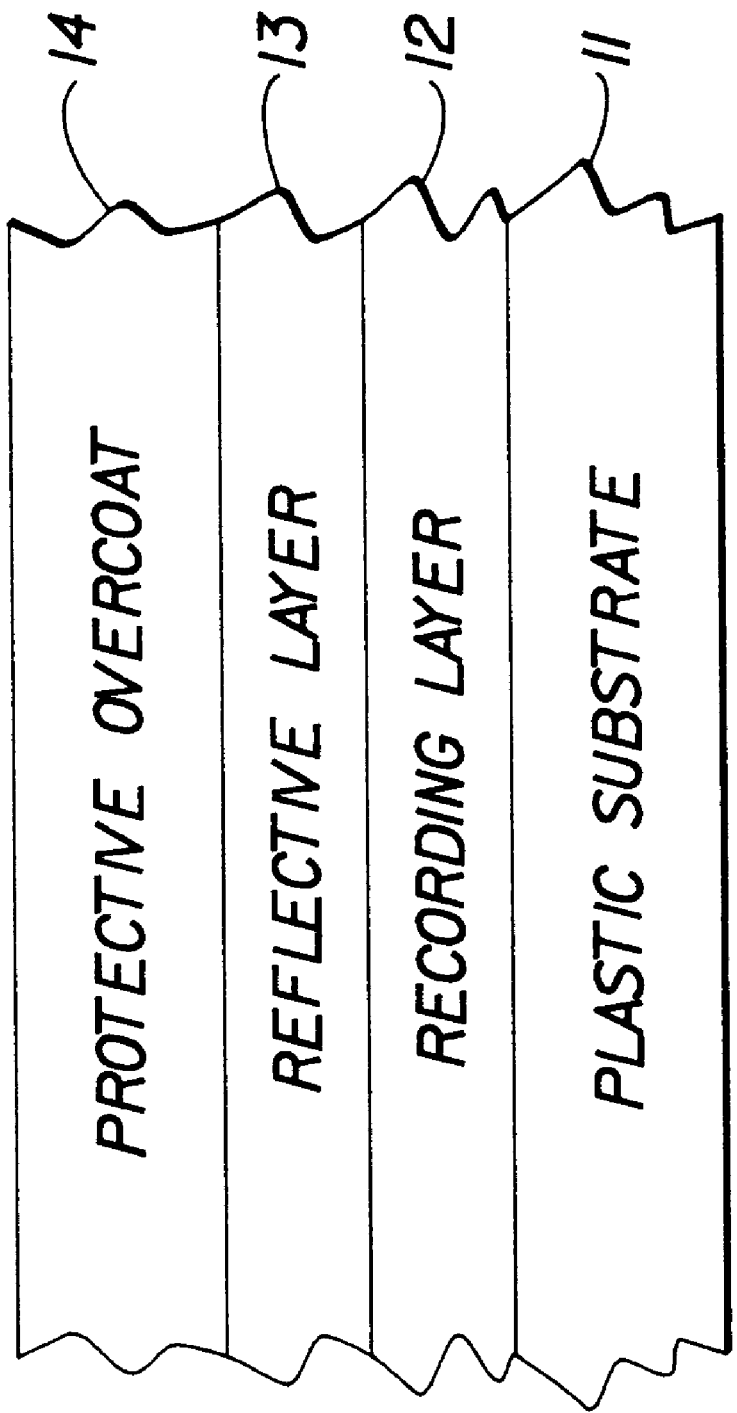
FIG. 1 is a cross-sectional view of the writable storage media such as a compact disk.

FIG. 1 has been described above as an example of the structure of a typical writable storage medium such as a compact disk. Silver has better reflectivity than gold at the typical operating wavelength of 780 nm. However, silver has a lower durability than gold and tarnishes or corrodes with time, thereby diminishing the reflectivity.

The alloy thin films were prepared by co-sputtering silver and palladium and/or copper using d.c. magnetron guns in an argon atmosphere. Specific alloy compositions were prepared by controlling the sputter power to the individual targets. The alloy thin films were deposited on glass, silicon, and poly-carbonate substrates.

Figure 2:
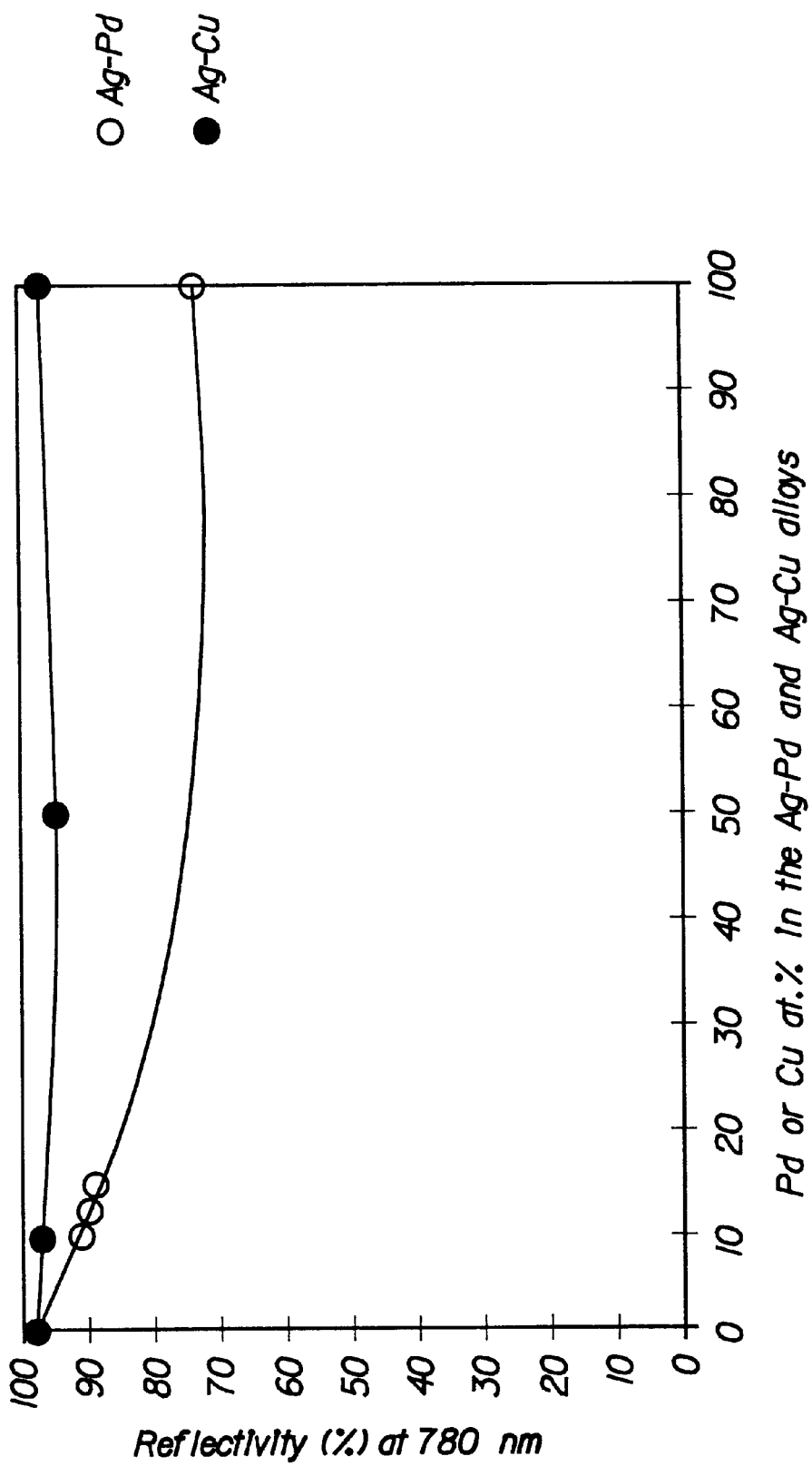
FIG. 2 shows the reflectivity as a function of concentration of palladium and copper in silver alloys.

The reflectivities of the pure metal films and the alloys were measured for materials deposited on silicon. The reflectivities were measured at the operating wavelength of 780 nm. The measurements are shown in FIG. 2. The reflectivities of the silver-palladium alloys are lower than the reflectivity of pure silver due to the diluting effects of the added palladium. The reflectivity decreases rapidly with increasing palladium concentration. However, the silver-copper reflectivities are comparable to pure silver thin films.

Figure 3:
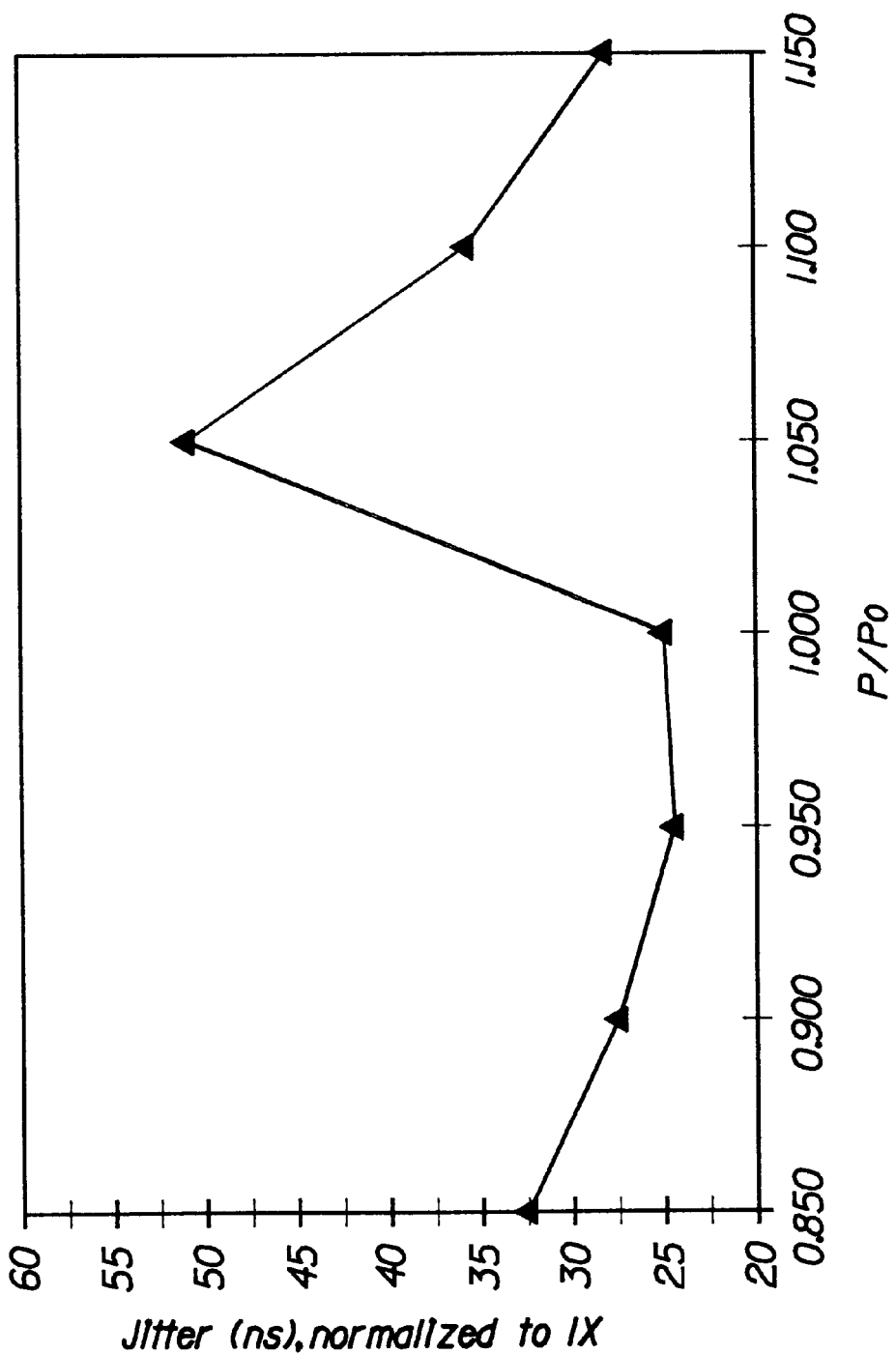
FIG. 3 shows the mark jitter as a function of write power for a gold layer reflector in a writable CD.
Figure 4:
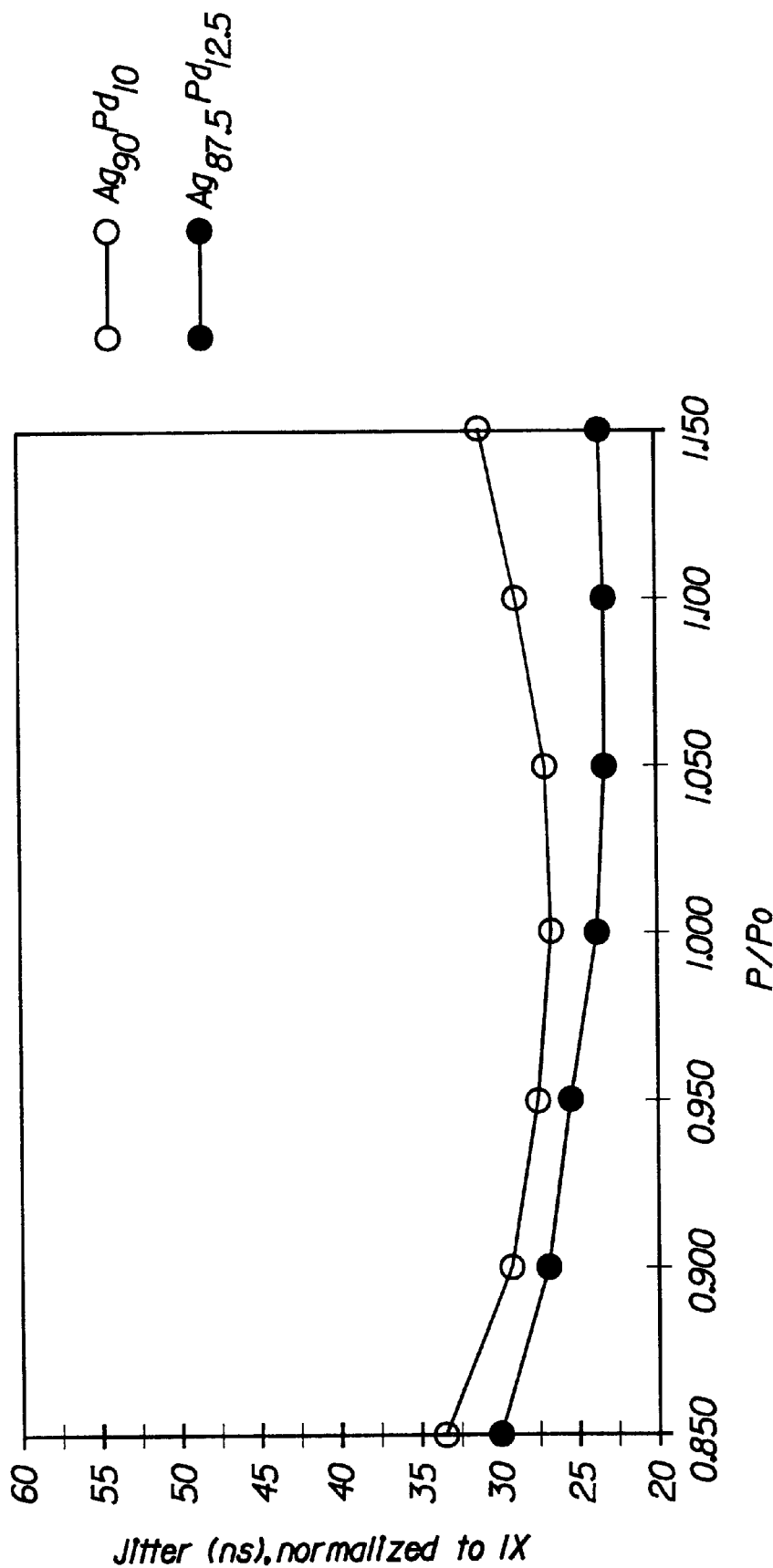
FIG. 4 shows the mark jitter as a function of write power for two silver-palladium alloys.
Figure 5:
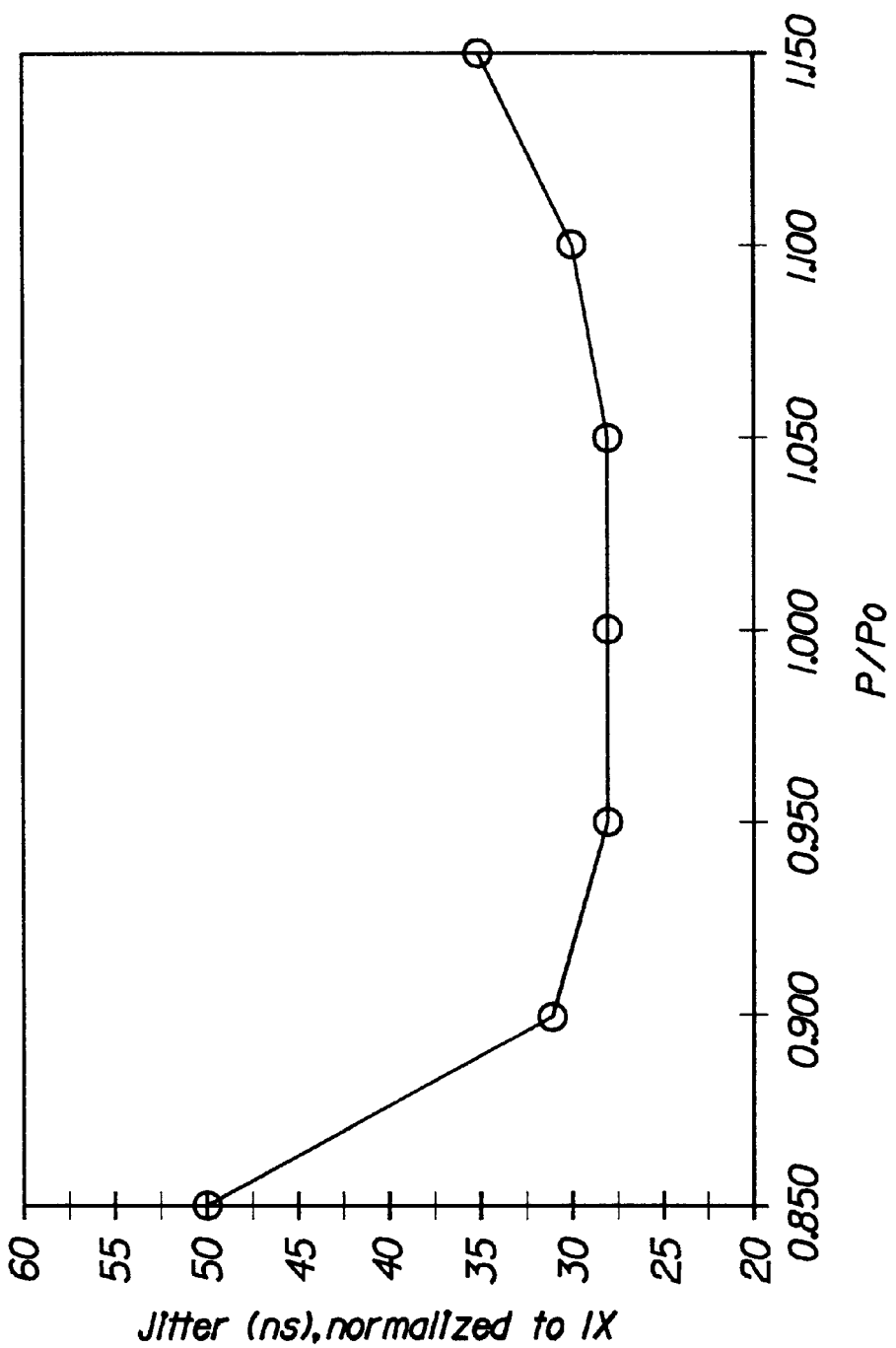
FIG. 5 shows the mark jitter as a function of power for a silver-copper alloy.

Complete compact disks were fabricated using silver alloys and gold films approximately 1000 Å thick. All reflecting layers were deposited on the (dye) recording layer under the same sputtering conditions. Then the lacquer overcoat layer was spin coated on the reflecting layer and the disks were tested for the NORP using standard testing conditions. The results of these tests are shown in FIGS. 3–5. These Figures show the jitter of marks recorded on the disks as a function of recording power for the disks with reflecting layers of pure gold, silver-palladium alloys and silver-copper alloys. It is clear from these Figures that the disks with silver-palladium reflecting layers have lower noise than disks with a pure gold reflecting layer.

The written tracks were examined under a differential interference contrast microscope. The disks with the silver-palladium alloy reflecting layers did not show significant deformations of the recording layer. The disks with the gold layer did show significant damage to the medium.

Figure 6:
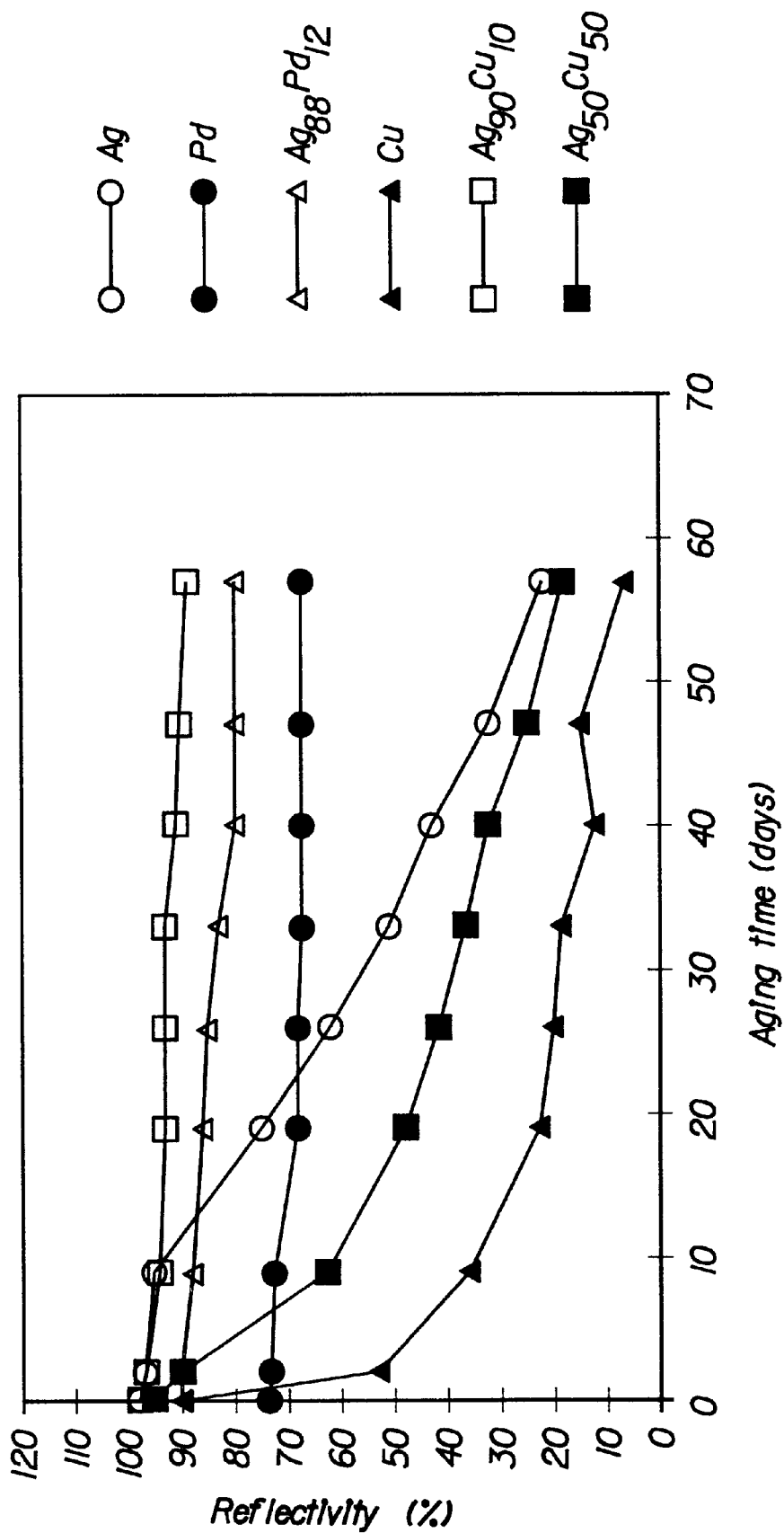
FIG. 6 shows the reflectivity of several alloys as a function of aging time.

The silver-palladium alloys and the silver-copper alloys have a higher environmental stability than pure silver or copper materials. By way of specific example, a stability test at 70° C. and 70% relative humidity was performed for the metals and alloys herein described. The changes in reflectivity as a function of time are shown in FIG. 6. The silver-palladium and the silver copper alloys have a greater environmental stability than the pure silver. The increase in the corrosion resistance of the silver-copper alloys depends on the copper content in the film, i.e., low copper concentration alloys (such as $Ag_{90}Cu_{10}$) have a better stability than copper rich alloys (such as $Ag_{50}Cu_{50}$).

While the measurement of the adhesion of the alloys to the (dye) recording layer has not been possible, simple mechanical scotch tape peeling tests indicate that the palladium, silver-palladium, and silver-palladium alloy films have very good adhesion to the organic polycarbonate substrate. Silver and gold films could be peeled off of the substrate. The decrease in the NORP parameter during recording speeds greater than the typical playing speed can possibly be due to the improved adhesion between the alloy layer and the (organic dye) recording layer.

2. Operation of the Preferred Embodiment

It will be now appreciated that the use of silver-palladium, silver-copper and silver-palladium-copper alloys as the reflecting material layer in writable optical storage media, including the writable CD disk, results in significantly lower jitter and reduced NORP parameters along with other advantages. The reflectivity of the film decreases rapidly with the increasing palladium although the corrosion resistance increases proportionately. Therefore best results are found when the amount of palladium in the alloy is limited to less than 15 at. % and preferably less than 10 at. %. Although the improvement in the corrosion resistance depends on the amount of copper in the alloy layer, the copper concentration should be limited to less than 30 at. % and preferably less than 20 at. %.

The properties of these materials are not completely understood at present. The palladium metal layer has a finer microstructure than the silver metal layer. It is thought that the small amounts of palladium in the alloy causes the film to nucleate in the same manner as palladium. The combined layer, as a consequence, tends to have basically the same microstructure as the palladium while having similar optical properties as the silver layers. The improved durability of the alloy films may be the result of the finer microstructure of the alloy films.

As indicated by U.S. Pat. 4,565,719, alloys of silver and palladium have been used in various applications in the past. However, there is no suggestion that the properties of these alloys would be useful in the writable CD environment.

Operation of the present invention is believed to be apparent from the foregoing description and drawings, but a few words will be added for emphasis. The advantages of the silver-palladium-copper alloy of the reflecting layer for writable compacts disks of the present invention as compared to reflecting layers of the related art include the relative stability when higher than illumination power is employed to write on the recording layer while maintaining the reflectivity of the gold layer of the prior art.

While the invention has been described with reference to the writable compact disk, it is apparent that the invention is easily adapted to other devices that have an optical storage layer in contact with a reflecting layer.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A compact disk capable of having information written thereon by a radiation beam, said compact disk comprising:
    a protective overcoat;
    a reflecting layer proximate said protective overcoat, wherein said reflecting layer is a silver-palladium alloy having a palladium content in the range from 1–15 at. %;
    a recording layer coupled to said reflecting layer; and
    a plastic substrate coupled to said recording layer.

2. The compact disk of claim 1 wherein said silver-palladium alloy further includes a copper component which is less than 30 at. % of the alloy.

3. The compact disk of claim 2 wherein said recording layer is comprised of a photo-sensitive organic dye.

4. A compact disk capable of having information written thereon by a radiation beam, said compact disk comprising:
    a protective overcoat;
    a reflecting layer coupled to said protective overcoat;
    a recording layer coupled to said layer; and
    a plastic substrate coupled to said recording layer, wherein said reflecting layer is a silver-copper alloy, wherein said copper content of said silver copper alloy is in the range of 1–30 at. %, wherein said silver-copper alloy further includes a palladium component, said palladium content being in the range of 1–15 at. % of said alloy.

5. The compact disk of claim 4 wherein said recording layer is comprised of a photo-sensitive organic dye.

6. In an optical storage medium in which an optical recording layer is proximate to a reflecting layer wherein said storage medium is a compact disk capable of having information written thereon after disk fabrication, the method of improving the jitter and the NORP parameters when said recording layer is irradiated with a radiation intensity greater than a normal operating intensity while maintaining an acceptable reflectivity from said reflecting layer, said method comprising the step of:
    depositing a reflecting layer of a silver-palladium alloy on said recording layer, wherein said palladium content of said silver-palladium alloy is in the range of 1–15 at. %.

7. The method of claim 6 wherein said depositing step includes a step of providing a copper component in said silver-palladium alloy, wherein said copper content of said alloy is in the range 30 at. %.

8. A storage medium for storing information by vertically oriented magnetic domains in a magneto-optic material wherein said storage medium is a compact disk capable of having information written thereon after disk fabrication, said information retrieved from said medium through interaction of said oriented domains with a radiation beam, said storage medium comprising:
    a substrate capable of transmitting a radiation beam having a selected wavelength;

a recording layer of a magneto-optic material coupled to said substrate, said recording layer capable of interacting with said radiation beam;

a reflecting layer coupled to said recording layer, said reflecting layer including a silver-palladium alloy, wherein a palladium content of said alloy is in the range of 1–15 at. %; and a protective layer coupled to said reflecting layer.

9. The storage medium of claim 8 wherein said silver-palladium alloy further includes a copper component, wherein said copper content is in the range of 1–30 at. %.

* * * * *